(12) United States Patent
Kato et al.

(10) Patent No.: US 12,365,360 B2
(45) Date of Patent: Jul. 22, 2025

(54) VEHICLE SYSTEM, CONTROL METHOD, AND STORAGE MEDIUM

(71) Applicant: HONDA MOTOR CO., LTD., Tokyo (JP)

(72) Inventors: Daichi Kato, Wako (JP); Takashi Kuboshima, Wako (JP); Masashi Kanesaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 18/121,610

(22) Filed: Mar. 15, 2023

(65) Prior Publication Data

US 2023/0311940 A1 Oct. 5, 2023

(30) Foreign Application Priority Data

Mar. 31, 2022 (JP) ................................. 2022-059771

(51) Int. Cl.
| | |
|---|---|
| *B60W 60/00* | (2020.01) |
| *B60W 10/20* | (2006.01) |
| *B60W 30/18* | (2012.01) |
| *B60W 50/10* | (2012.01) |
| *B62D 6/00* | (2006.01) |

(52) U.S. Cl.
CPC .......... *B60W 60/001* (2020.02); *B60W 10/20* (2013.01); *B60W 30/18163* (2013.01); *B60W 50/10* (2013.01); *B62D 6/00* (2013.01); *B60W 2555/00* (2020.02)

(58) Field of Classification Search
CPC ............... B60W 60/001; B60W 10/20; B60W 30/18163; B60W 50/10; B60W 2555/00; B62D 6/00
See application file for complete search history.

(56) References Cited

U.S. PATENT DOCUMENTS

| | | | |
|---|---|---|---|
| 11,396,297 B2* | 7/2022 | Kanoh | B60W 10/20 |
| 2017/0106876 A1* | 4/2017 | Gordon | B60W 60/0059 |
| 2018/0354510 A1* | 12/2018 | Miyata | B60W 30/18163 |
| 2018/0354518 A1* | 12/2018 | Inou | B60W 60/00272 |
| 2019/0071099 A1* | 3/2019 | Nishiguchi | B62D 15/0255 |
| 2019/0072970 A1* | 3/2019 | Izumori | B60W 30/18145 |

(Continued)

FOREIGN PATENT DOCUMENTS

| | | |
|---|---|---|
| JP | 2015-168406 | 9/2015 |
| JP | 2020-069896 | 5/2020 |

(Continued)

OTHER PUBLICATIONS

Japanese Office Action for Japanese Patent Application No. 2022-059771 mailed Sep. 12, 2023.

*Primary Examiner* — Hussein Elchanti
(74) *Attorney, Agent, or Firm* — Amin, Turocy & Watson, LLP

(57) ABSTRACT

A vehicle system recognizes a situation of surroundings of a host vehicle, automatically controls at least steering of the host vehicle on the basis of the recognized situation of the surroundings to cause the host vehicle to perform lane change, acquires information on a route from a navigation device guiding the route along which the host vehicle travels, and suppresses control for assisting the steering on the basis of an event regarding the route when the event occurs in the navigation device.

14 Claims, 10 Drawing Sheets

(56) References Cited

U.S. PATENT DOCUMENTS

| | | | |
|---|---|---|---|
| 2019/0084572 A1* | 3/2019 | Oishi | B60Q 1/40 |
| 2019/0143983 A1* | 5/2019 | Hashimoto | G05D 1/0088 |
| | | | 701/23 |
| 2019/0329780 A1* | 10/2019 | Tomescu | B62D 15/029 |
| 2020/0050195 A1* | 2/2020 | Gross | B60W 10/08 |
| 2020/0130670 A1 | 4/2020 | Ogawa | |
| 2020/0148204 A1* | 5/2020 | Kunz | B60W 60/0013 |
| 2020/0307628 A1 | 10/2020 | Kato et al. | |
| 2020/0398849 A1* | 12/2020 | Kanoh | G08G 1/16 |
| 2021/0261050 A1* | 8/2021 | Sobhany | B60Q 3/80 |
| 2021/0300160 A1* | 9/2021 | Haïdar | B60J 3/06 |
| 2021/0300367 A1* | 9/2021 | Yamashita | G06V 20/584 |

FOREIGN PATENT DOCUMENTS

| | | |
|---|---|---|
| JP | 2020-160940 | 10/2020 |
| JP | 2021-160541 | 10/2021 |

* cited by examiner

FIG. 6

REROUTE GENERATION

| PATTERN | STATE BEFORE TRIGGER GENERATION | TRIGGER OF REROUTE | STATE AFTER TRIGGER GENERATION |
|---|---|---|---|
| PATTERN 1 (MANUAL: SETTING OF NEW DESTINATION) | NO DESTINATION | MANUAL: USER SETS NEW DESTINATION | DESTINATION |
| PATTERN 2 (MANUAL: CHANGING OF DESTINATION/WAYPOINT) | DESTINATION | MANUAL: USER CHANGES DESTINATION/WAYPOINT | DESTINATION |
| PATTERN 3 (AUTOMATIC: AUTOMATIC SEARCH) | DESTINATION | AUTOMATIC: AUTOMATIC REROUTE (TRAFFIC CONGESTION CONSIDERATION /SMART ROUTE SEARCH) | DESTINATION |
| PATTERN 4 (MANUAL: DESTINATION ERASURE /GUIDANCE INTERRUPTION) | DESTINATION | MANUAL: USER DESTINATION ERASURE /GUIDANCE INTERRUPTION | NO DESTINATION |

FIG. 7

| PATTERN | OPERATION BEFORE MPU UPDATES ROUTE | (NAVIGATION DEVICE IS CALCULATING ROUTE) |
|---|---|---|
| PATTERN 1 (MANUAL: SETTING OF NEW DESTINATION) NO DESTINATION→DESTINATION | ROUTE GUIDANCE IS BEING PERFORMED (CONTROL AT TIME OF BRANCHING IS NOT PERFORMED CONTROL AT TIME OF DECREASE IN NUMBER OF LANES IS BEING EXECUTED) | ROUTE GUIDANCE FUNCTION CONTINUES (CONTROL AT TIME OF DECREASE IN NUMBER OF LANES CONTINUES) |
| | ROAD RECOMMENDATION FUNCTION IS BEING PERFORMED | ROAD RECOMMENDATION FUNCTION IS NOT PROVIDED |
| PATTERN 2 (MANUAL: CHANGING OF DESTINATION/WAYPOINT) DESTINATION→DESTINATION | ROUTE GUIDANCE IS BEING PERFORMED | ROUTE GUIDANCE FUNCTION IS NOT PROVIDED (CONTROL AT TIME OF DECREASE IN NUMBER OF LANES CONTINUES) |
| | ROAD RECOMMENDATION FUNCTION IS BEING PERFORMED | ROAD RECOMMENDATION FUNCTION IS NOT PROVIDED |
| PATTERN 3 (AUTOMATIC: AUTOMATIC SEARCH) DESTINATION→DESTINATION | ROUTE GUIDANCE IS BEING PERFORMED | ROUTE GUIDANCE FUNCTION CONTINUES |
| | ROAD RECOMMENDATION FUNCTION IS BEING PERFORMED | ROAD RECOMMENDATION FUNCTION CONTINUES |
| PATTERN 4 (MANUAL: DESTINATION ERASURE /GUIDANCE INTERRUPTION) DESTINATION→NO DESTINATION | ROUTE GUIDANCE IS BEING PERFORMED | ROUTE GUIDANCE FUNCTION IS NOT PROVIDED (SINCE REROUTE CALCULATION TIME IS NOT GENERATED, ROAD RECOMMENDATION START) |
| | ROAD RECOMMENDATION FUNCTION IS BEING PERFORMED | ROAD RECOMMENDATION FUNCTION CONTINUES |

FIG. 8

| PATTERN | OPERATION BEFORE MPU UPDATES ROUTE (NAVIGATION DEVICE IS CALCULATING ROUTE) | | |
|---|---|---|---|
| | BRANCH | DECREASE IN NUMBER OF LANES | ROAD |
| PATTERN 1 (MANUAL: SETTING OF NEW DESTINATION) NO DESTINATION→DESTINATION | | ○ | × |
| PATTERN 2 (MANUAL: CHANGING OF DESTINATION/WAYPOINT) DESTINATION→DESTINATION | × | ○ | × |
| PATTERN 3 (AUTOMATIC: AUTOMATIC SEARCH) DESTINATION→DESTINATION | ○ | ○ | ○ |
| PATTERN 4 (MANUAL: DESTINATION ERASURE /GUIDANCE INTERRUPTION) DESTINATION→NO DESTINATION | × | ○ | ○ |

○ CONTINUE
× STOP

VEHICLE SYSTEM, CONTROL METHOD, AND STORAGE MEDIUM

CROSS-REFERENCE TO RELATED APPLICATION

Priority is claimed on Japanese Patent Application No. 2022-059771, filed Mar. 31, 2022, the content of which is incorporated herein by reference.

BACKGROUND

Field of the Invention

The present invention relates to a vehicle system, a control method, and a storage medium.

Description of Related Art

In recent years, efforts to provide a sustainable transportation system that takes various situations into account have become active. In order to realize this, research and development are focused on further improving the safety or convenience of traffic through research and development regarding driving assistance technology. For example, devices that automatically execute lane change have been disclosed (Japanese Unexamined Patent Application, First Publication Nos. 2021-160541 and 2015-168406).

SUMMARY

In a vehicle control device of the related art, events that occur in a navigation device are not taken into consideration when adjusting the navigation path. This may give a user a sense of discomfort and degrade convenience for the user. For example, a discrepancy between guidance in the navigation device and a behavior of a vehicle is caused and convenience for the user is degraded.

The present invention has been made in consideration of such circumstances, and one object thereof is to provide a vehicle system, a control method, and a storage medium capable of improving convenience for a user. For example, it is possible to improve the convenience for the user by suppressing discrepancies between the guidance in the navigation device and the behavior of the vehicle and by preventing discomfort to the user. Further, the present invention contributes to the development of sustainable transportation systems.

The vehicle system, control method, and storage medium according to the present invention adopt the following configurations.

(1): A vehicle system according to one aspect of the present invention includes a storage medium configured to store computer-readable instructions; and one or more processors connected to the storage medium, wherein the one or more processors execute the computer-readable instructions to: recognize a situation of surroundings of a host vehicle, automatically control at least steering of the host vehicle on the basis of the recognized situation of the surroundings to cause the host vehicle to perform lane change, acquire information on a route from a navigation device guiding the route along which the host vehicle travels, and suppress control for assisting the steering on the basis of an event regarding the route when the event occurs in the navigation device.

(2): In the aspect (1), the event includes one or more of an event for setting a destination of the host vehicle, an event for changing the destination, an event for setting a waypoint, an event for changing the waypoint, an event for erasing the destination, an event for erasing the waypoint, an event for searching for the route, an event for erasing the route, or an event for interrupting route-based guidance.

(3): In the aspect (1) or (2), the one or more processors execute the computer-readable instructions to: change content of control at the time of suppression on the basis of a type of the event.

(4): In any one of the aspects (1) to (3), the one or more processors execute the computer-readable instructions to: suppress first control for assisting the steering according to a proposal of the vehicle system when the event occurs and permit second control for assisting the steering executed on the basis of an operation according to an intention of a driver of the host vehicle.

(5): In any one of the aspects (1) to (4), the one or more processors execute the computer-readable instructions to: be able to execute first control for causing the host vehicle to automatically perform lane change to a lane to a destination or waypoint (hereinafter referred to as a target point), and stop first control based on a route to a first target point in a case in which an event in which a user changes the target point from the first target point to a second target point occurs when the first control based on the route to the first target point is being executed.

(6): In any one of the aspects (1) to (5), the one or more processors execute the computer-readable instructions to: be able to execute first control for causing the host vehicle to automatically perform lane change to a lane to a destination or waypoint (hereinafter referred to as a target point) and execute the first control after acquiring a route to a new destination from the navigation device when the event is a setting of the new destination.

(7): In any of aspect (5) or (6), the one or more processors execute the computer-readable instructions to: be able to execute third control for proposing causing the host vehicle to perform lane change to an adjacent lane adjacent to a lane in which the host vehicle travels without considering the destination, and causing the host vehicle to automatically perform the lane change to the adjacent lane when the proposal is approved by a driver, and stopping the third control in a case in which an event in which the target point is changed or an event in which a new target point is set occurs when the third control is being executed.

(8): In any one of the aspects (1) to (7), the one or more processors execute the computer-readable instructions to: be able to execute first control for causing the host vehicle to automatically perform lane change to a lane to a destination or waypoint (hereinafter referred to as a target point) and continue first control based on a route to a first target point in a case in which an event in which the navigation device searches for the route to the first target point without depending on an operation of a user occurs when the first control based on the route to the first target point is being executed.

(9): In the aspect of (8), the one or more processors execute the computer-readable instructions to: be able to execute third control for proposing causing the host vehicle to perform lane change to an adjacent lane adjacent to a lane in which the host vehicle travels without considering the destination, and causing the host vehicle to automatically perform the lane change to the adjacent lane when the proposal is approved by a driver and continue the third control in a case in which an event in which the navigation device searches for a route to the first target point without depending on an operation of the user occurs when the third control is being executed.

(10): In any one of the aspects (1) to (9), the one or more processors execute the computer-readable instructions to: be able to execute first control for causing the host vehicle to automatically perform lane change to a lane to a destination or waypoint (hereinafter referred to as a target point), be able to execute third control for proposing causing the host vehicle to perform lane change to an adjacent lane adjacent to a lane in which the host vehicle travels without considering the destination, and causing the host vehicle to automatically perform the lane change to the adjacent lane when the proposal is approved by a driver, and suspend the first control and start the third control in a case in which an event in which a user performs an operation for erasing a first target point or suspending the guidance to the first target point occurs when first control based on a route to the first target point is being executed.

(11): In any one of the aspects (1) to (10), the one or more processors execute the computer-readable instructions to be able to execute first control for causing the host vehicle to automatically perform lane change to a lane to a destination or waypoint (hereinafter referred to as a target point), and the navigation device derives a target route for travel toward a second target point in a case in which an event in which the target point is changed to the second target point occurs when first control for travel toward a first target point is being performed, and the one or more processors execute the computer-readable instructions to stop the first control for travel toward the first target point when the event occurs, and execute first control based on the target route when the target route is acquired from the navigation device.

(12): In any one of aspects (1) to (11), the one or more processors execute the computer-readable instructions to be able to execute first control for causing the host vehicle to automatically perform lane change to a lane to a destination or waypoint (hereinafter referred to as a target point), and the navigation device generates an event in which a first route to the first target point is automatically updated without depending on an operation of the user when first control for travel toward the first target point is being performed, and derives a second route depending on the event, and the one or more processors execute the computer-readable instructions not to stop first control based on first route when the event occurs, and to stop the first control based on the first route and execute first control based on the second route when the second route is acquired from the navigation device.

(13): A control method according to another aspect of the present invention includes a control device executing: processing of recognizing a situation of surroundings of a host vehicle, processing of automatically controlling at least steering of the host vehicle on the basis of the recognized situation of the surroundings to cause the host vehicle to perform lane change, processing of acquiring information on a route from a navigation device guiding the route along which the host vehicle travels, and processing of suppressing control for assisting the steering on the basis of an event regarding the route when the event occurs in the navigation device.

(14): A storage medium having a program stored therein according to another aspect of the present invention, the program causing a control device to execute: processing of recognizing a situation of surroundings of a host vehicle, processing of automatically controlling at least steering of the host vehicle on the basis of the recognized situation of the surroundings to cause the host vehicle to perform lane change, processing of acquiring information on a route from a navigation device guiding the route along which the host vehicle travels, and processing of suppressing control for assisting the steering on the basis of an event regarding the route when the event occurs in the navigation device.

According to the aspects (1) to (14), it is possible to eliminate inconsistency between guidance in the navigation device and a behavior of the vehicle and prevent discomfort to the user. Further, since steering assistance is appropriately performed, the convenience for the user is improved.

According to the aspect (5), when the target point is changed, the vehicle system stops the first control, thereby suppressing discrepancy between the guidance of the navigation device and the control of the host vehicle.

According to the aspect (7), the vehicle system stops the third control when the target point is changed or the target point is newly set, making it possible to prevent hindering the host vehicle traveling toward the changed target point or the newly set target point.

According to the aspect (8) or (9), the vehicle system continues the first control or the third control when the navigation device generates an event in which searching for a route to the first target point is performed, making it possible to improve convenience for a user and improve marketability.

According to aspect (10), the vehicle system suspends the first control and immediately starts the third control when an event in which the first target point is erased or the guidance is suspended occurs, making it possible to improve convenience for a user.

BRIEF DESCRIPTION OF THE DRAWINGS

FIG. 6 is a diagram for describing a reroute occurrence event.

FIG. 7 is a diagram (part 1) for describing processing at the time of reroute occurrence.

FIG. 8 is a diagram (part 2) for describing processing at the time of reroute occurrence.

DETAILED DESCRIPTION OF THE INVENTION

[Overall Configuration]

Figure 1:
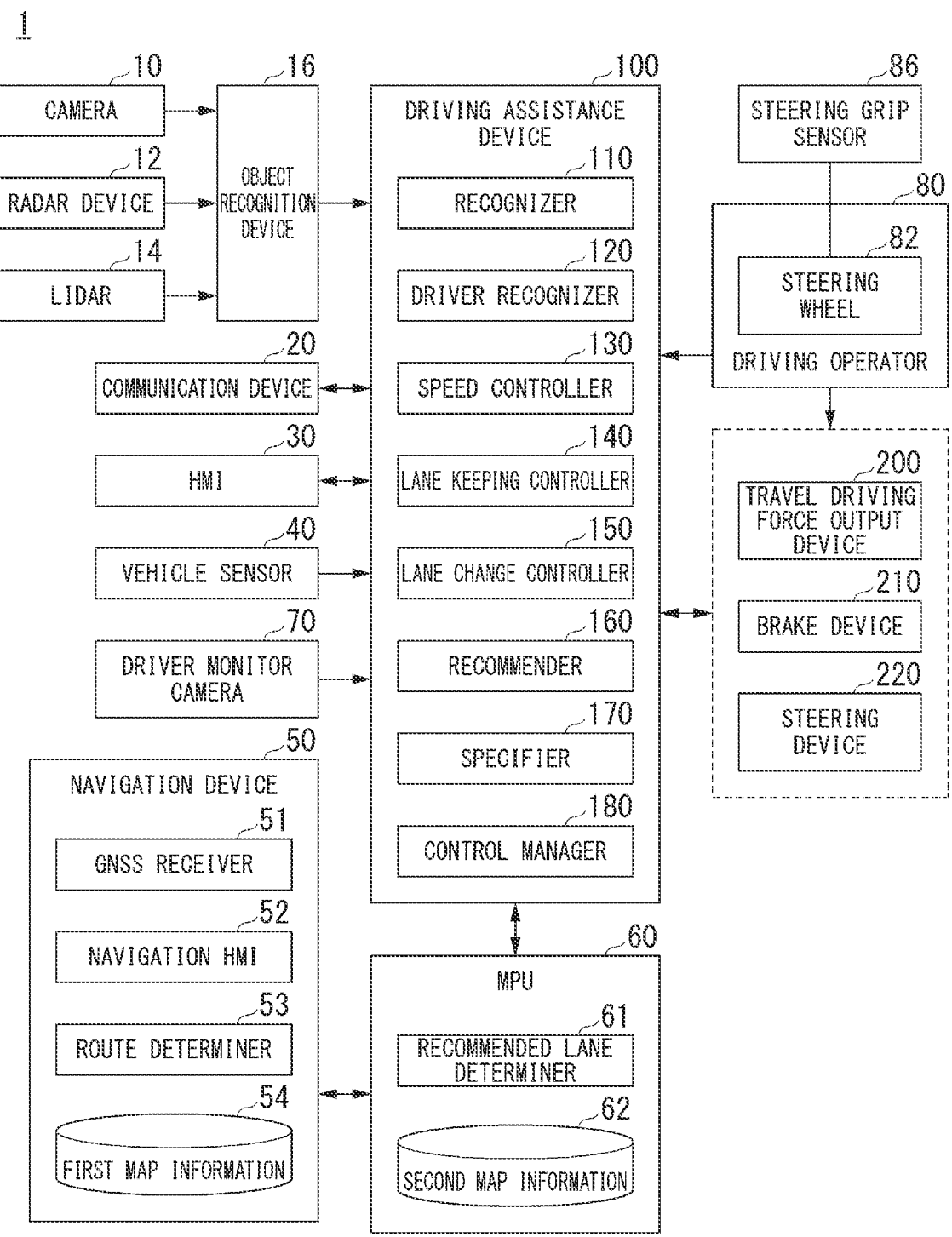
FIG. 1 is a configuration diagram of a vehicle system using a vehicle control system according to an embodiment.

FIG. 1 is a configuration diagram of a vehicle system 1 using a vehicle control system according to an embodiment. A vehicle on which the vehicle system 1 is mounted is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, an MPU 60, a driver monitor camera 70, a driving operator 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or other configurations may be added thereto. The driving assistance device 100 is an example of a "control device".

The camera 10 is, for example, a digital camera using a solid-state imaging device such as a charge coupled device (CCD) or a complementary metal oxide semiconductor (CMOS). The camera 10 is attached to any location on a vehicle on which the vehicle system 1 is mounted (hereinafter referred to as a host vehicle M). When a forward side is imaged, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target on the basis of the time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the driving assistance device 100. The object recognition device 16 may output detection results of the camera 10, the radar device 12, and the LIDAR 14 as they are to the driving assistance device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the host vehicle M and receives an input operation from the occupant. The HMI 30 includes various display devices, speakers, buzzers, touch panels, switches, keys, and the like. The HMI 30 has a display device. The display device is a so-called multi-information display, which is a display device that is provided, for example, in a central part of an instrument panel of the host vehicle M and displays various types of information in the host vehicle M, of a speedometer that indicates a traveling speed of the host vehicle M or a tachometer that indicates the number of rotations (a rotational speed) of an internal combustion engine included in the host vehicle M.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route. The recommended lane determiner 61, for example, determines that the host vehicle M travels in a lane connected to the branch lane several kilometers before the branch lane, or determines that the host vehicle M travels in an adjacent lane when the lane disappears several kilometers ahead. The recommended lane determiner is an example of the "acquisition unit".

The second map information 62 is map information with higher accuracy than the first map information 54. The second map information 62 includes, for example, information on the center of the lane or information on a boundary of the lane. The second map information 62 may include road information, traffic regulation information, address information (an address and postal code), facility information, telephone number information, and the like. The second map information 62 may be updated at any time by the communication device 20 communicating with another device.

The driver monitor camera 70 is, for example, a digital camera using a solid-state imaging device such as a CCD or CMOS. The driver monitor camera 70 is attached to any location on the host vehicle M at a position and orientation at which a head of an occupant (hereinafter referred to as a driver) seated in a seat of the driver of the host vehicle M can be imaged from the front (in an orientation in which a face is imaged). For example, the driver monitor camera 70 is attached to an upper part of the display device provided in the central part of the instrument panel of the host vehicle M. The driver monitor camera 70 outputs to the driving assistance device 100 an image obtained by imaging the vehicle cabin including the driver of the host vehicle M from a position at which the driver monitor camera 70 is disposed.

The driving operator 80 includes, for example, an operation switch of a direction indicator, an accelerator pedal, a brake pedal, a shift lever, and other operators, in addition a steering wheel 82. A sensor that detects an amount of operation or the presence or absence of an operation is attached to the driving operator 80, and a detection result thereof is output to the driving assistance device 100, or some or all of the travel driving force output device 200, the brake device 210, and the steering device 220. The steering wheel 82 does not necessarily have to be annular but may be in the form of a modified steering wheel, joystick, buttons, or the like. A steering grip sensor 86 is attached to the steering wheel 82.

The steering grip sensor 86 is realized by, for example, a capacitance sensor or a piezoelectric element. The steering grip sensor 86 detects whether or not the driver is gripping the steering wheel 82. The gripping is a state in which the driver grips the steering wheel, a state in which a hand comes into contact with the steering wheel and a predetermined degree or more of force is applied to the steering wheel, or the like.

The steering grip sensor 86 may detect grip based on an image captured by a camera or detect the grip using an optical scheme such as a radar device (a scheme that does not require contact with a sensor).

The driving assistance device 100 includes, for example, a recognizer 110, a driver recognizer 120, a speed controller 130, a lane keeping controller 140, a lane change controller 150, a recommender 160, a specifier 170, a control manager 180. Some or all of these functional units are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the driving assistance device 100 in advance or may be stored in a detachable storage medium such as a DVD or a CD-ROM and installed in the HDD or flash memory of the driving assistance device 100 by the storage medium (a non-transitory storage medium) being mounted in a drive device. A functional configuration including the lane change controller 150, the recommender 160, and the control manager 180 is an example of a "controller".

The recognizer 110 recognizes a status such as a position, speed, and acceleration of an object present around the host vehicle M on the basis of information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin and is used for control. The position of the object may be represented by a representative point such as a centroid or a corner of the object or may be represented by an area. The "status" of the object may include an acceleration or jerk of the object, or an "action status" (for example, whether or not the object is changing lanes or is about to perform lane change).

The recognizer 110, for example, recognizes a lane (a traveling lane) in which the host vehicle M is traveling. For example, the recognizer 110 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 110 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of the INS may be additionally considered. The recognizer 110 recognizes a temporary stop line, an obstacle, a red signal, a toll gate, and other road events.

The recognizer 110 recognizes a position or posture of the host vehicle M with respect to the traveling lane when recognizing the traveling lane. The recognizer 110 may recognize, for example, a deviation of a reference point of the host vehicle M from a center of the lane and an angle formed between a traveling direction of the host vehicle M and a line connecting the center of the lane as a relative position and posture of the host vehicle M with respect to the traveling lane. Instead, the recognizer 110 may recognize, for example, a position of the reference point of the host vehicle M with respect to any one of side edge portions (the road demarcation line or the road boundary) of the traveling lane as the relative position of the host vehicle M with respect to the traveling lane.

The driver recognizer 120 detects whether the driver is in a predetermined state on the basis of the image captured by the driver monitor camera 70. The predetermined state is a state in which hands-off lane keeping control, which will be described later, is executable. Hands-off is a state in which the driver does not grip the steering wheel, and hands-on is a state in which the driver grips the steering wheel. The state in which the hands-off lane keeping control is executable is a state in which the driver monitors the forward side. Monitoring the forward side means, for example, that the driver monitors the forward side so that the driver can rapidly perform takeover from control of the vehicle by the system to an operation with respect to the vehicle by the driver. Monitoring the forward side means, for example, that a line of sight of the driver is directed to the forward side.

The speed controller 130 automatically controls the travel driving force output device 200 and the brake device 210 without depending on the operation of the driver to automatically control the speed of the host vehicle M. The speed controller 130 executes so-called adaptive cruise control (ACC).

For example, when another vehicle is not present in front of the host vehicle M and within a predetermined distance from the host vehicle M, the speed controller 130 automatically controls the travel driving force output device 200 and the brake device 210 without depending on an operation of the driver so that the host vehicle M moves at a speed set by the driver or a legal speed.

For example, when another vehicle is present in front of the host vehicle M and within the predetermined distance from the host vehicle M, the speed controller 130 automatically controls the travel driving force output device 200 and the brake device 210 without depending on an operation of the driver so that the host vehicle M follows the other vehicle. "Following" means that the host vehicle M travels while maintaining a position behind the other vehicle and at a predetermined distance from the other vehicle.

The lane keeping controller 140 controls the steering device 220 so that the host vehicle M does not deviate from the traveling lane. For example, the lane keeping controller 140 controls the steering device 220 so that the host vehicle M travels at a center or near the center of the traveling lane recognized by the recognizer 110. Hereinafter, this control may be referred to as "lane keeping control". The Lane keeping controller 140 performs hands-on lane keeping control and hands-off lane keeping control.

The hands-on lane keeping control is control that is executed in the state in which the driver is gripping the steering wheel (a state in which the steering grip sensor 86 is detecting gripping of the steering wheel). The conditions under which the hands-on lane keeping control is executable are looser than the conditions under which the hands-off lane keeping control is executable. For example, the hands-on lane keeping control is executed on the condition that the speed of the host vehicle M is equal to or higher than a predetermined speed and the driver is monitoring the forward side.

The hands-off lane keeping control is control that is executed in a state in which the driver does not grip the steering wheel (a state in which the steering grip sensor 86 does not detect gripping of the steering wheel). The hands-off lane keeping control is executable, for example, when the following conditions are satisfied. The conditions are that the speed of the host vehicle M is equal to or higher than the predetermined speed, that the host vehicle M travels on a predetermined road (for example, a road or a type of road set in advance as the hands-off lane keeping control being executable), and that the driver monitors the forward side. The hands-off lane keeping control is executed when the driver monitors the forward side, and the hands-off lane keeping control is not executed or stopped when the driver does not monitor the forward side.

The conditions under which the hands-on lane-keeping control and the hands-off lane-keeping control described above are executable are examples, and other conditions (for example, the host vehicle M follows a preceding vehicle) may be included, or some of the conditions may be omitted. The conditions under which the hands-on lane keeping control is executable may be looser than the conditions under which the hands-off lane keeping control is executable (the conditions under which the hands-off lane keeping control is executable may be stricter than the conditions under which the hands-on lane keeping control is executable).

The lane change controller 150 causes the host vehicle M to automatically change lanes. The lane change controller 150 causes the host vehicle M to automatically change lanes (ALC: auto lane change) when a lane change instruction is issued by the driver in a state in which the hands-off lane keeping control is being executed. The lane change instruction is an operation with respect to a lever of the operation switch of the direction indicator. For example, when the driver operates the lever in a direction in which the host vehicle M is desired to perform lane change, the host vehicle M performs lane change in a direction corresponding to the operation. This control is an example of "second control".

The lane change instruction may be an operation different from the operation with respect to the lever of the operation switch of the direction indicator. For example, the lane change may be performed when a predetermined operation button is pressed. When the driver approves the recommendation of the recommender 160, which will be described later, the lane change controller 150 causes the host vehicle M to perform lane change on the basis of the approval.

The lane change controller 150, for example, may execute lane change on the condition that the driver grips the steering wheel (the steering grip sensor 86 detects gripping of the steering wheel). The lane change controller 150 executes the lane change when the driver grips the steering wheel and further when the following conditions are satisfied, for example.

The conditions are, for example, that there are no obstacles in a lane that is a lane change destination, that the host vehicle M does not interfere with other vehicles around the host vehicle M when the host vehicle M performs the lane change, that a section is not a section in which lane change is prohibited (there is no road marking or sign indicating prohibition of the lane change), that the lane that is a lane change destination is recognized (actually present), that a yaw rate detected by the vehicle sensor 40 is smaller than a threshold, and that a radius of a curvature of a road on which the host vehicle M is traveling is equal to or larger than a predetermined value. The conditions for executing the lane change may include other conditions, or some of the conditions may be omitted.

The recommender 160 proposes the lane change of the host vehicle M to the driver. This processing will be described in detail later.

The specifier 170 specifies the position of the host vehicle M in map information (the first map information 54 or the second map information 62) including the information on lanes on the basis of the map information and the position of the host vehicle M. The map information includes the information on lanes. The information on the lanes is, for example, information such as a position at which the lane disappears or a position at which the lane decreases, and a position at which the lane connects to the branch lane. The specifier 170 specifies position of the host vehicle in the map information on the basis of the map information and the position of the host vehicle M. The specifier 170 specifies, for example, a position at which the lane connects to the branch lane with respect to the position of the host vehicle M. For example, the specifier 170 specifies that the branch lane connects to the traveling lane 5 km ahead.

The control manager 180 causes the recommender 160 to recommend lane change on the basis of the position of the host vehicle M. The control manager 180 causes the lane change controller 150 to perform lane change of the host vehicle M when the driver approves the recommendation. The control manager 180 instructs the lane change controller 150 to perform lane change, thereby causing the lane change controller 150 to execute the lane change of the host vehicle M. Processing of the control manager 180 will be described in detail later.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an ECU that controls these. The ECU controls the above configuration according to information input from the driving assistance device 100 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving assistance device 100 or the information input from the driving operator 80 so that a brake torque according to a braking operation is output to each wheel.

The steering device 220 includes, for example, a steering ECU and an electric motor. The electric motor, for example, changes orientations of steerable wheels by causing a force to act on a rack and pinion mechanism. The steering ECU drives the electric motor according to the information input from the driving assistance device 100 or the information input from the driving operator 80 to change the orientations of the steerable wheels.

[Steering Assistance Executed by Driving Assistance Device]

The driving assistance device 100 executes road recommendation and route guidance recommendation. The route guidance recommendation is recommendation for causing the host vehicle M to perform lane change when lane change is necessary. The route guidance recommendation includes recommendation at the time of branching and recommendation at the time of decrease in the number of lanes. Hereinafter, these will be described. Control regarding the road recommendation is an example of "third control", and control regarding the branching recommendation (control at the time of branching) is an example of "first control".

[Road Recommendation]

Figure 2:
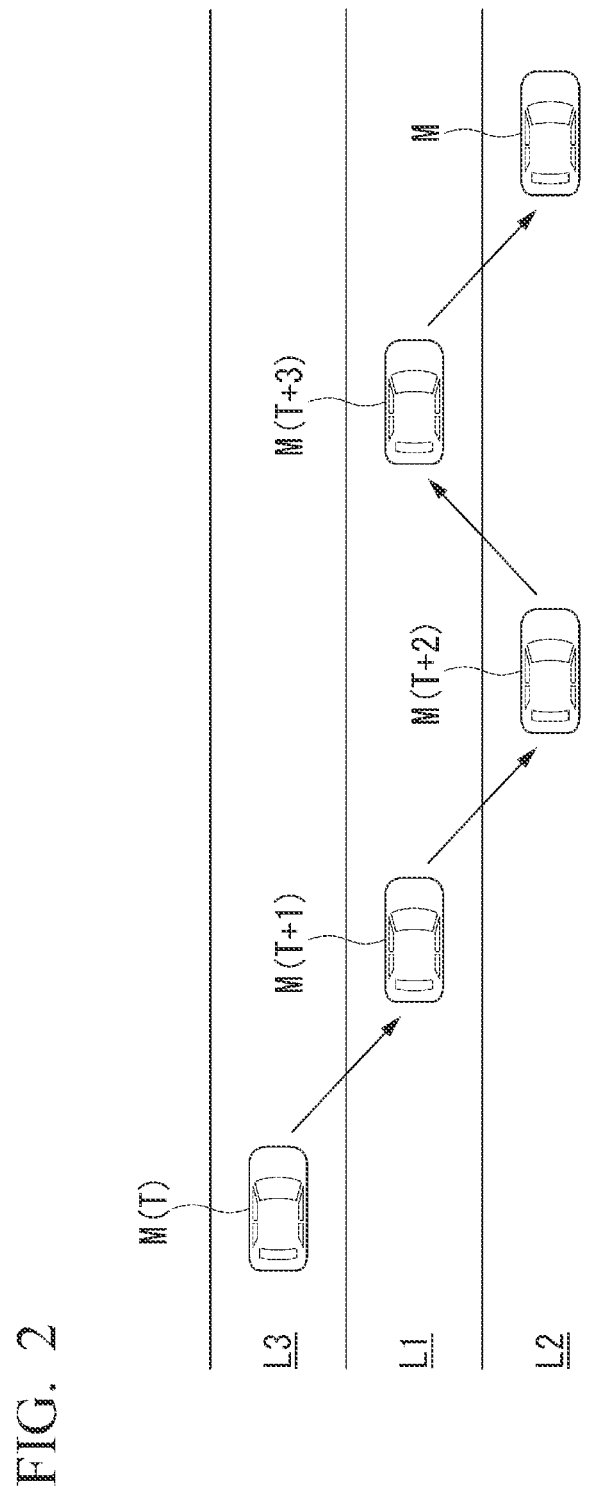
FIG. 2 is a diagram showing an example of a scene in which a recommender recommends lane change.

The recommender 160 recommends lane change to the driver. FIG. 2 is a diagram showing an example of a scene in which the recommender 160 recommends lane change. In FIG. 2, a first lane L1 and a third lane L3 are traveling lanes, and a second lane L2 is an overtaking lane. The first lane L1 is a lane provided between the second lane L2 and the third lane L3.

When the host vehicle M is traveling in the third lane L3 on the basis of control according to the ACC and the hands-off lane keeping control (at time T), the recommender 160 makes recommendation to cause the host vehicle M to perform lane change to the first lane L1, for example. The recommendation is made by voice, an image, or the like via the HMI 40, for example. When the driver operates an approval button (not shown) in response to the recommendation and grips the steering wheel, the lane change controller 150 causes the host vehicle M to perform lane change. The approval for the recommendation may be performed one of the operation of the approval button and the gripping of the steering wheel, or may be both of the operation of the approval button and the gripping of the steering wheel.

When the host vehicle M is traveling in the first lane L1 (at time T+1), the recommender 160, for example, makes recommendation to cause the host vehicle M to perform lane change to the third lane L3, which is an overtaking lane. When the host vehicle M changes lanes and travels in the second lane L2 (at time T+2), the recommender 160, for example, makes recommendation to cause the host vehicle M to perform lane change to the first lane L1, which is the traveling lane, and makes recommendation to cause the host vehicle M to perform lane change to the third lane L3, which is an overtaking lane, when the host vehicle M performs lane change to the first lane L1 (at time T+3).

Thus, the recommender 160 makes recommendation to cause the host vehicle M to perform lane change to the overtaking lane when the host vehicle M is located in the traveling lane, and to cause the host vehicle M to perform lane change to an adjacent traveling lane when the host vehicle M is located in the overtaking lane. Hereinafter, this processing may be referred to as "road recommendation". Lane change according to the road recommendation is an example of "third control for proposing the driver to perform lane change to an adjacent lane adjacent to a lane in which the host vehicle travels without considering the destination, and causing the host vehicle to automatically perform lane change to the adjacent lane when the proposal is approved by the driver".

When the host vehicle M is scheduled to travel on a branch road connected to the third lane L3, the recommender 160 stops the road recommendation and makes recommendation to cause the host vehicle M to perform lane change to the third lane L3. The recommender 160 stops the road recommendation and makes the recommendation at the time of branching when the position of the host vehicle M satisfies conditions, as will be described later.

The road recommendation may be made in the following manner. The recommender 160 may recommend lane change to overtake (catch up) a preceding vehicle when there is the preceding vehicle in front of the host vehicle M and the host vehicle M is likely to overtake the preceding vehicle after a predetermined time. The recommender 160 may recommend lane change to give way to a vehicle behind the host vehicle M when there is the vehicle behind the host vehicle M and the vehicle behind the host vehicle M is likely to overtake the host vehicle M after a predetermined time. When the host vehicle M travels in the first traveling lane L1 and it is assumed that the host vehicle M will interfere with travel of other vehicles traveling in the second lane L2 when the host vehicle M will perform lane change to the second lane L2, the recommender 160 may recommend the host vehicle M to perform lane change to the third lane L3. That is, the recommender 160 may propose lane change to a lane to which the lane change is possible.

[Recommendation at the Time of Branching]

Figure 3:
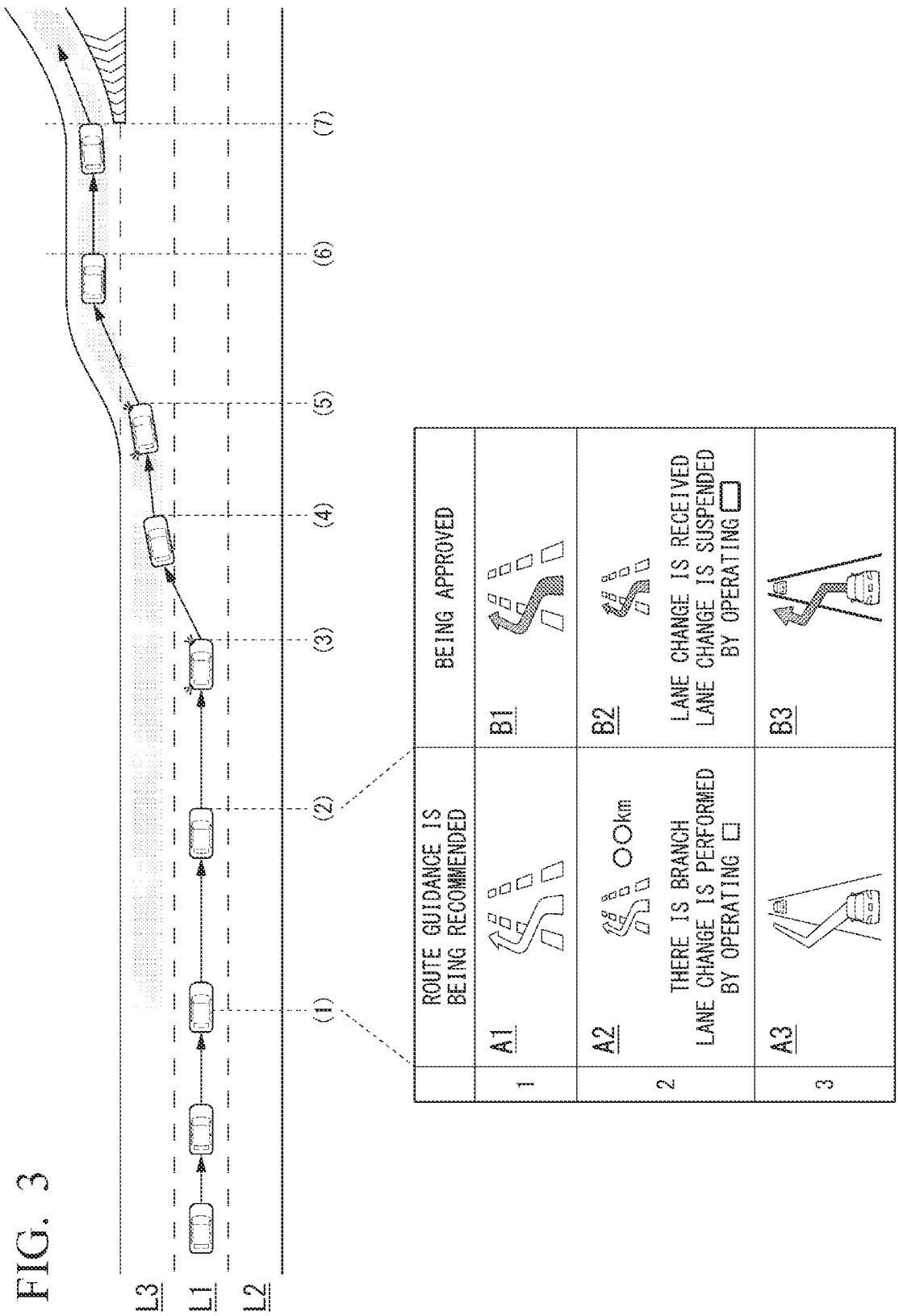
FIG. 3 is a diagram showing an example of a scene in which a host vehicle M travels in a branch lane.

When the destination of the host vehicle M is set and the host vehicle M travels in the branch lane toward the destination, the following control (control at the time of branching) is executed. FIG. 3 is a diagram showing an example of a scene in which the host vehicle M travels in the branch lane. In the example of FIG. 3, the third lane L3 connects to the branch lane. The host vehicle M is present at a predetermined distance in the traveling direction from a connection position P at which the third lane L3 connects to the branch lane. It is assumed that the host vehicle M passes through the position (1), the position (2), the position (3), the position (4), and the position (5), reaches the connection position P, and then, enters the branch lane and passes through the position (6) and the position (7). In the following description, description of the speed control of the host vehicle M will be omitted, but the speed is appropriately adjusted (ACC is executed) in consideration of a surroundings situation, and is controlled so that the lane change is performed smoothly when the host vehicle M performs the lane change.

The hands-off lane keeping control is executed and the road recommendation is made until the host vehicle M reaches the position (1). When the host vehicle M reaches the position (1), the recommendation at the time of branching is made. The recommendation at the time of branching is recommendation for changing the host vehicle M to perform lane change to the branch lane.

The control manager 180 causes an image A1 to be displayed in the first area of the display, causes an image A2 to be displayed in the second area, and causes an image A3 to be displayed in the third area. The recommendation at the time of branching is made for a first time (for example, a maximum of 10 seconds).

The first area, the second area, and the third area may be different displays (display devices), or may be different areas in one display. For example, the first area, the second area, and the third area may be different areas in a multi-information display provided in front of a seat of the driver. The image displayed in the first area is, for example, an image corresponding to an indicator that notifies the driver of the state of the host vehicle M.

The image A1 is, for example, an image for recommending performing lane change to the third lane L3, which is a branch lane. The image A2 includes information indicating that there is a branch at a predetermined distance ahead, information indicating that the lane change can be performed when the approval button is operated, and the image A1. The image A3 is, for example, an image including the surroundings situation of the host vehicle M, and an image showing a future trajectory of the host vehicle M when the host vehicle M performs the lane change. The surroundings situation of the host vehicle M is, for example, an image showing information of other vehicles that are detected by the vehicle system 1, road demarcation lines, and the like.

It is assumed that the driver has approved the lane change in a section from the position (1) that the host vehicle M reaches to the position (2) that the host vehicle M reaches. In this case, the control manager 180 causes an image B1 to be displayed in the first area of the display, causes an image B2 to be displayed in the second area, and causes an image B3 to be displayed in the third area. The images B1, B2, and B3 are displayed for a second time (for example, a maximum of 30 seconds). The second time is longer than the first time.

The image B1 is an image in which an arrow indicating a direction of the lane change of the host vehicle M included in the image B1 is emphasized as compared to the arrow of the image A1. The image B2 includes information indicating that the lane change has been received, information indicating that the lane change can be suspended when the approval button is operated, and the image B1. The image B3 is the same information as the image A3, but colors of arrows, road demarcation lines, and the like of the image A3 are different. In the image B3, reception of the lane change is represented by change to colors different from colors used in the image A3.

When the recommendation is not approved at the position (3) or at a predetermined distance before the position (3), the following steering assistance is not started, and the driver needs to perform lane change of the host vehicle M. For example, the driver drives the host vehicle M to perform lane change, or operates the direction indicator to cause the lane change controller 150 to perform lane change of the host vehicle M.

When the host vehicle M reaches the position (3), steering assistance is started. The start of the steering assistance means that the host vehicle M starts a lane change operation. The start of the operation may be that the control manager 180 turns on the direction indicator or may be that the host vehicle M has started lateral movement. The start of the operation may be another preset operation. A condition for the steering assistance is hands-on. An image showing that "the steering assistance is being performed" is displayed when operation assistance is being performed".

The host vehicle M completes the lane change to the third lane L3 at the position (4) and then, the control manager 180 turns on the direction indicator without depending on the operation of the driver and causes the host vehicle M to perform lane change from the third lane L3 to the branch lane at the position (5). The control manager 180 causes the host vehicle M to perform lane change a plurality of times and guides the host vehicle M to the destination according to one approval when a plurality of lane changes are required and the recommendation at the time of branching is approved.

The lane change of the host vehicle M to the third lane L3 is completed at the position (6). When the host vehicle M reaches the position (7) that is a branch end position, the control manager 180 ends the driving assistance. Accordingly, the speed control and the steering control in the driving assistance device 100 end. After the end, the driver operates the driving operator 80 to drive the host vehicle M.

[Recommendation at the Time of Decrease in the Number of Lanes]

Figure 4:
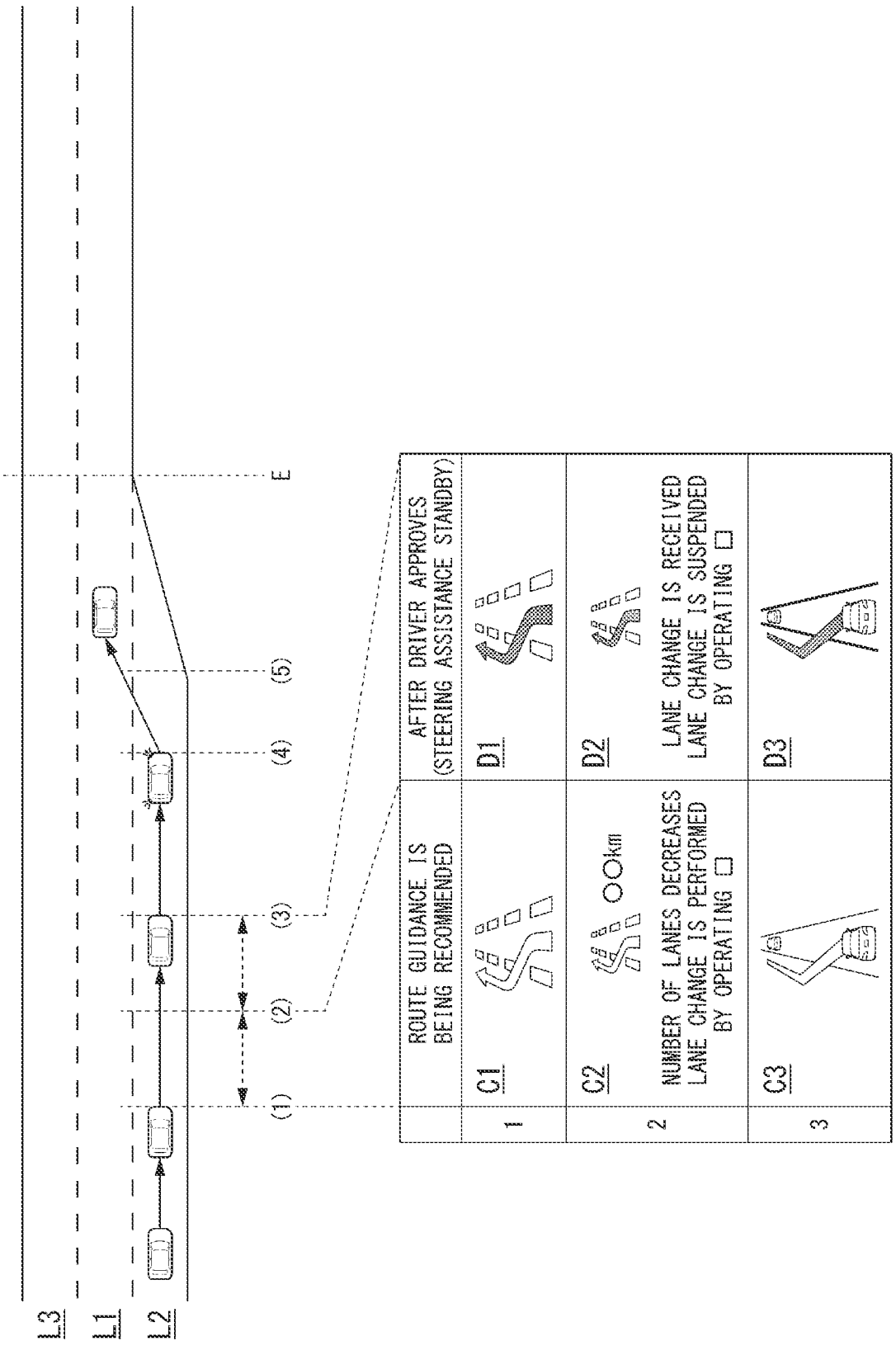
FIG. 4 is a flowchart showing an example of a flow of processing that is executed by a driving assistance device.

When the host vehicle M is traveling in a disappearing lane, the driving assistance device 100 executes control at the time of a decrease in the number of lanes to guide the route so that the host vehicle M performs lane change to an adjacent lane. FIG. 4 is a diagram for describing the control at the time of a decrease in the number of lanes. In the example of FIG. 4, it is assumed that the host vehicle M is traveling in the second lane L2 that disappears a predetermined distance ahead. In the example of FIG. 4, a position (1), a position (2), a position (3), a position (4), and a position (5) are farther away in this order in a traveling direction from a disappearance position E of the third lane L3. In the following description, the speed control of the host vehicle M will be omitted, but the speed is appropriately controlled in consideration of a surroundings situation so that the lane change is performed smoothly.

Hands-off lane keeping control is executed until the host vehicle M reaches the position (1). At the position (1), the road recommendation stops. In the section from the position (1) that the host vehicle M reaches to the position (2) that the host vehicle M reaches, the recommendation at the time of decrease in the number of lanes is made. The recommendation at the time of decrease in the number of lanes is recommendation for causing the host vehicle M to perform lane change from a decreasing lane to the traveling lane adjacent to the decreasing lane. The control manager 180 causes an image C1 to be displayed in the first area of the display, causes an image C2 to be displayed in the second area, and causes an image C3 to be displayed in the third area. Recommendation at the time of lane change is made during the first time (for example, a maximum of 10 seconds).

The image C1 is the same as the image A1. The image C2 includes information indicating that the lane will decrease a predetermined distance ahead, information indicating that the lane change can be performed when the approval button is operated, and the image C1. The image C3 has the same information as the image A3.

It is assumed that the driver has approved the lane change in the section from the position (2) that the host vehicle M reaches to the position (3) that the host vehicle M reaches. In this case, a steering assistance standby state is entered, and the control manager 180 causes an image D1 to be displayed in the first area of the display, causes an image D2 to be displayed in the second area, and causes an image D3 to be displayed in the third area. The images D1, D2, and D3 are displayed during a second time (for example, a maximum of 30 seconds). The second time is longer than the first time.

The image D1 is an image in which an arrow indicating a direction of the lane change of the host vehicle M included in the image C1 is emphasized as compared to the arrow of the image C1. The image D2 includes information indicating that the lane change has been received, information indicating that the lane change can be suspended when the approval button is operated, and the image D1. The image D3 is the same information as the image C3, but colors of arrows, road demarcation lines, and the like of the image C3 are different. In the image D3, reception of the lane change is represented by colors used in the image C3 and change in the colors.

When the recommendation is not approved at the position (3) or at a predetermined distance before the position (3), the following steering assistance is not started, and the driver needs to perform lane change of the host vehicle M. For example, the driver drives the host vehicle M to perform lane change, or operates the direction indicator to cause the lane change controller 150 to perform lane change of the host vehicle M.

When the host vehicle M reaches the position (3), steering assistance is started. The start of the steering assistance means that the host vehicle M starts a lane change operation. The start of the operation may be that the control manager 180 turns on the direction indicator, or may be that the host vehicle M has started lateral movement. The start of the operation may be another preset operation. A condition for the steering assistance is hands-on. At the position (5), the lane change of the host vehicle M is completed. After the completion, the road recommendation may be resumed.

The position (4) is a position at which the steering assistance is given up. When the host vehicle M cannot start lateral movement by a time when the host vehicle M reaches the position (4), the steering assistance is suspended. "The host vehicle M cannot perform the lateral movement" means, for example, that the driver does not grip the steering wheel, that the host vehicle M cannot start lane change according to a situation of surrounding vehicles (for example, that the host vehicle M interferes with other vehicles when lane change is performed), that driving assistance device 100 has determined that recognition of the position of the host vehicle M is indefinite, that the lanes cannot be recognized, that traffic congestion is occurring ahead, and that conditions on which the lane change cannot be started are satisfied. Further, operation assistance is also stopped when a condition for interrupting the lane change after the lateral movement has been started are satisfied. The interrupting condition is, for example, a condition that is the same as or similar to a condition that the host vehicle M cannot start the lateral movement.

As described above, it is possible to improve convenience for the user because the driving assistance device 100 makes the road recommendation and the route guidance recommendation.

[Cooperation Between Navigation Device, MPU, and Driving Assistance Device]

Figure 5:
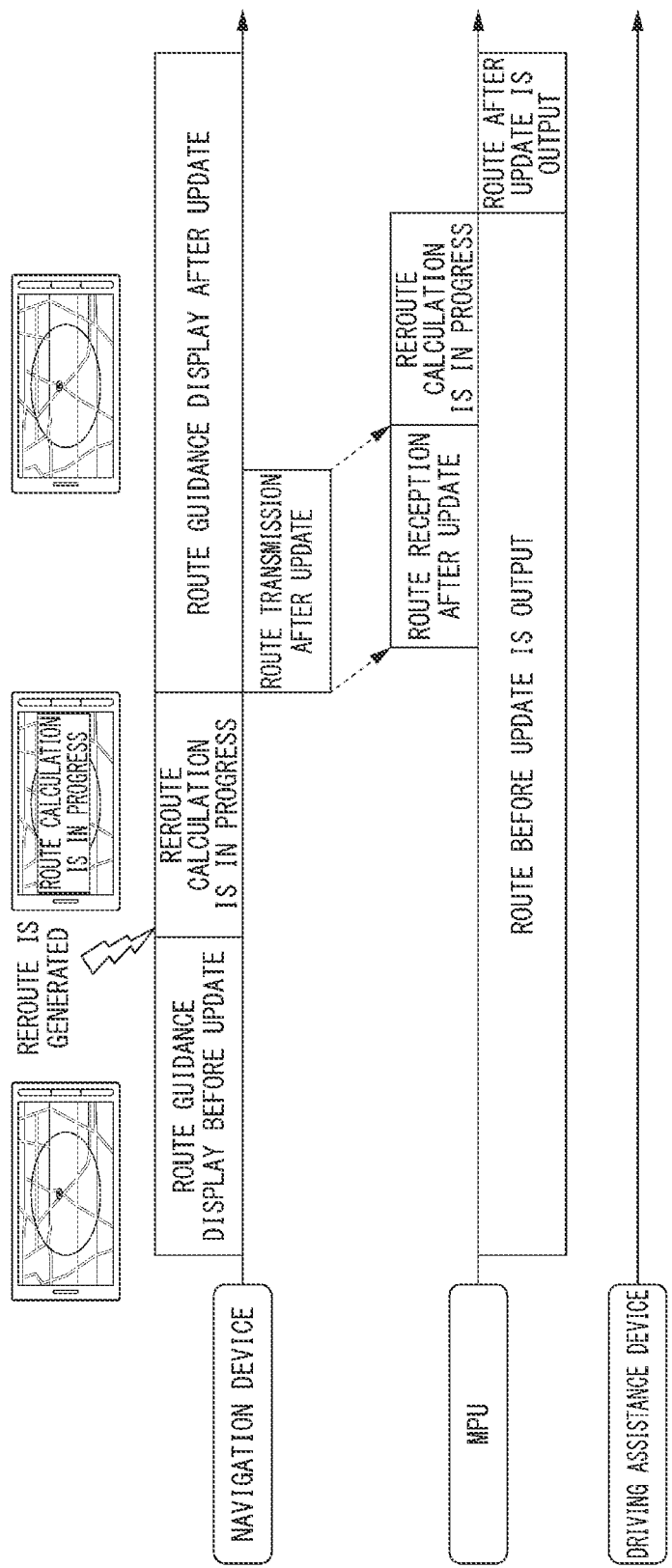
FIG. 5 is a diagram for describing control that is executed by a navigation device, an MPU, and a driving assistance device 100.

FIG. 5 is a diagram for describing control that is executed by the navigation device 50, the MPU 60, and the driving assistance device 100. The navigation device 50 causes a route before update to be displayed on the display and performs guidance before a reroute occurrence event (which will be described in detail later) occurs. When the reroute occurrence event occurs, the navigation device 50 starts reroute calculation and causes information indicating that the reroute calculation is in progress to be displayed on the display. The guidance continues when the navigation device 50 automatically updates the route in consideration of traffic congestion.

When the reroute calculation ends, the navigation device 50 causes the updated route to be displayed on the display and performs guidance. The navigation device 50 transmits the updated route to the MPU 60 when the reroute calculation ends. After the MPU 60 receives the updated route from the navigation device 50, the MPU 60 starts the reroute calculation. This calculation is processing of generating a lane in which the host vehicle M travels, a lane change plan, and the like on the basis of the route generated by the navigation device 50. After the MPU 60 ends the reroute calculation, the MPU 60 outputs the updated route. When the driving assistance device 100 receives the updated route from the MPU 60, the driving assistance device 100 controls the host vehicle M on the basis of the updated route.

As described above, a timing at which the driving assistance device 100 controls the host vehicle M on the updated route may be delayed with respect to a timing at which the navigation device 50 starts guidance on the updated route. Therefore, in the present embodiment, processing that will be described later with reference to FIG. 7 is executed to prevent discomfort to the user and improve convenience for the user.

[Reroute Occurrence Event]

Hereinafter, the reroute occurrence event will be described with reference to FIG. 6. The reroute occurrence events include patterns 1 to 4. Pattern 1 is a manual setting of a new destination. Manual means by an operation of the user. Pattern 1 is a pattern in which change occurs from a state in which a destination is not set to a state in which a new destination is set.

Pattern 2 is manual change in the destination or waypoint (hereinafter referred to as a target point). Pattern 2 is a pattern in which a set target point is changed to another target point by an operation of the user.

Pattern 3 is a pattern in which reroute has started automatically. Pattern 3 is a pattern in which the set target point is not changed and the navigation device 50 automatically performs reroute without depending on an operation of the user. For example, the navigation device 50 generates a route for avoiding traffic congestion in consideration of traffic congestion or performs smart route search. The smart route search is to search for a route for quickly reaching the target point while reducing toll road costs. Pattern 3 is an example of an "event for searching for a route".

Pattern 4 is a pattern in which a manually set target point is erased or guidance is interrupted. Pattern 4 is a pattern in which the set target point is erased or an operation for interrupting the guidance to the target point is performed by the user.

[Processing at the Time of Reroute Occurrence]

When a reroute occurrence event regarding route derivation occurs in the navigation device 50, the control manager 180 suppresses control for assisting steering on the basis of the event. The control manager 180 changes content of control at the time of suppression on the basis of a type of the event.

FIG. 7 is a diagram for describing processing at the time of reroute occurrence. FIG. 8 is a diagram in which content of FIG. 7 is summarized more simply.

Pattern 1 will be described. Since Pattern 1 is a pattern in which a new destination is set, the recommendation at the time of branching is not made. After the driving assistance device 100 acquires a route to a new destination from the navigation device 50, the driving assistance device 100 makes the recommendation at the time of branching on the basis of the route. In a case in which an event of pattern 1 occurs in the navigation device 50 when the recommendation at the time of decrease in the number of lanes is being made, recommendation at the time of a decrease in the number of lanes (route guidance function) continues (is provided). In a case in which the event of pattern 1 occurs when the road recommendation is made, the road recommendation is suspended (not provided). By the road recommendation being suspended, recommending the lane change in a direction in which route guidance (branching control) after reroute is hindered is suppressed.

Pattern 2 will be described. In a case in which the event of pattern 2 occurs when branching is being recommended, the recommendation at the time of branching (route guidance function) is suspended. This is intended to suppress occurrence of discrepancy between the guidance of the navigation device 50 and the branching recommendation. In a case in which the event of pattern 2 occurs when the recommendation at the time of decrease in the number of lanes is being executed, the recommendation at the time of decrease in the number of lanes (route guidance function) continues. In a case in which the event of pattern 2 occurs when control based on the road recommendation is being executed, the road recommendation is suspended. This is for the same reason as in pattern 1.

Pattern 3 will be described. In a case in which the event of pattern 3 occurs when branching is being recommended, the recommendation at the time of branching (route guidance function) continues. When the event of pattern 3 occurs when the control at the time of a decrease in the number of lanes is being executed, control at the time of the control at the time of a decrease in the number of lanes continues. In a case in which the event of pattern 3 occurs when the control based on the road recommendation is being executed, the road recommendation continues.

In Pattern 3, reasons why the control at the time of branching and the road recommendation are not restricted are as follows. These are that the event of pattern 3 occurs relatively frequently (for example, once every few minutes), and the marketability is reduced when the recommendation is restricted each time. Even when the event of pattern 3 occurs, the route often does not change. Therefore, discrepancy between the guidance of the navigation device 50 and the guidance of the route at the time of branching is not often caused. This is because the route does not often change due to the event of pattern 3, and thus, the lane change in a direction in which the route guidance (branching control) is hindered is not recommended even when the road recommendation continues.

Pattern 4 will be described. In a case in which an event of pattern 4 occurs when branching is being recommended, the recommendation at the time of branching (route guidance function) is suspended. In a case in which an event of pattern 4 occurs when the recommendation at the time of decrease in the number of lanes is being executed, the recommendation at the time of decrease in the number of lanes (route guidance function) continues. When the recommendation at the time of branching is suspended, the road recommendation is immediately started (the first control is suspended and the third control is started). This is because the discrepancy is caused as described above when the recommendation at the time of branching continues. In a case in which the event of pattern 4 occurs when the control based on the road recommendation is being executed, the road recommendation continues. This is because there is no influence before entrance to a route for the route guidance.

In each of the above patterns, lane change according to an operation based on an intention of the driver is permitted. For example, the lane change (second control) executed by the lane change controller 150 by the driver operating an operator for operating the direction indicator is permitted.

Although the case in which the reroute event occurs when the recommendation is started has been described in the above example, the same processing may be executed in a case in which the reroute occurs after the recommendation has been approved or after the steering assistance has actually started.

Although it has been described that the branching recommendation and the road recommendation are not suppressed in pattern 3, the branching recommendation or road recommendation may be suppressed instead.

[Flowchart]

Figure 9:
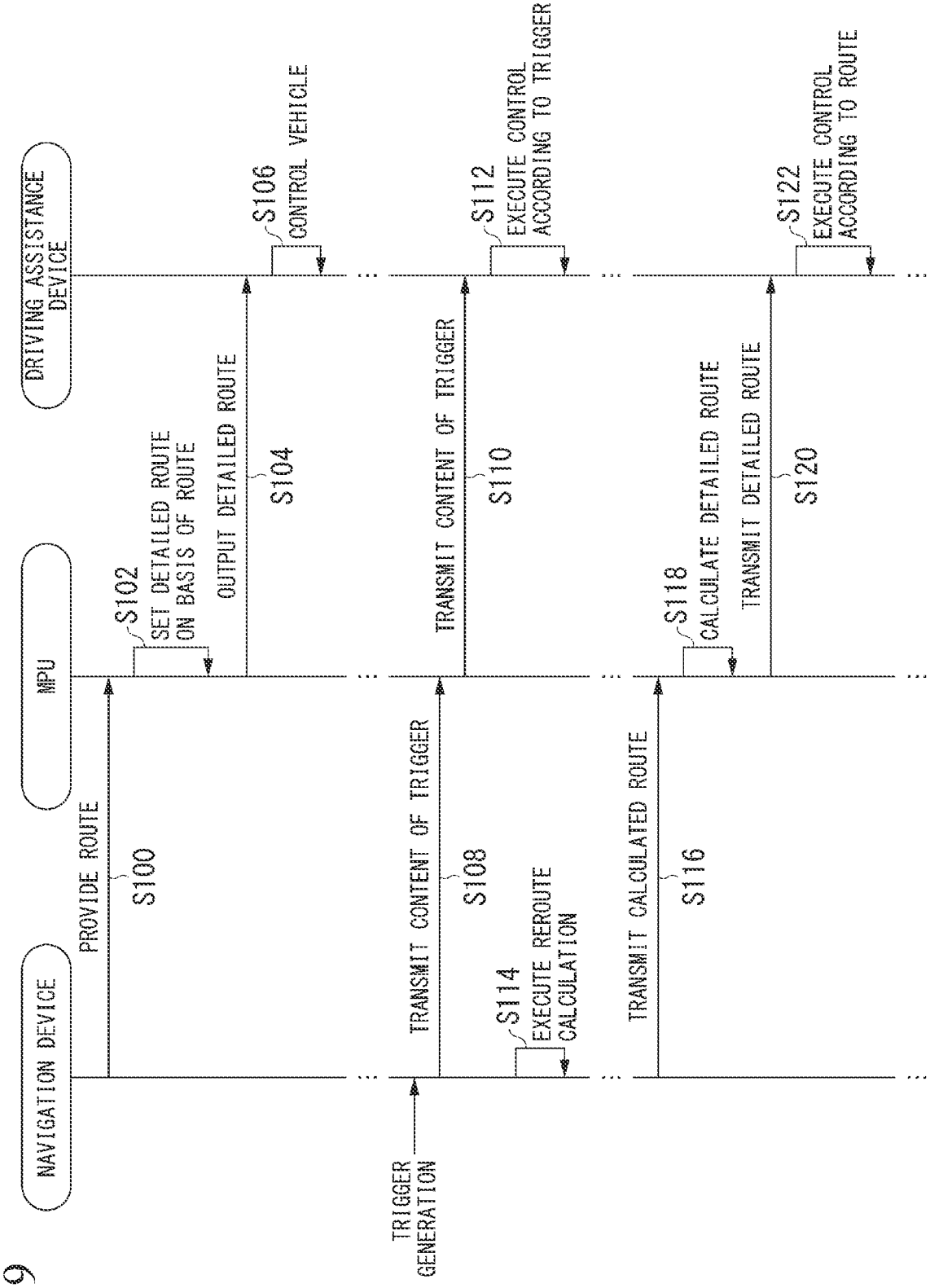
FIG. 9 is a sequence diagram showing an example of a flow of processing that is executed by the navigation device, the MPU, and the driving assistance device.

FIG. 9 is a sequence diagram showing an example of a flow of processing that is executed by the navigation device 50, the MPU 60, and the driving assistance device 100. First, the navigation device 50 provides the route to the MPU 60 (step S100). The MPU 60 sets a detailed route including, for example, a lane in which the host vehicle travels on the basis of the provided route (step S102). Next, the MPU 60 outputs the set detailed route to the driving assistance device 100 (step S104). Next, the driving assistance device 100 controls the host vehicle M on the basis of the detailed route output by the MPU 60 (step S106). Accordingly, the branching recommendation is made, as necessary.

When a trigger occurs, the navigation device 50 transmits content of the trigger to the MPU 60 (step S108), and the MPU 60 transmits the transmitted content of the trigger to the driving assistance device 100 (step S110). The driving assistance device 100 executes control according to the trigger (step S112). When the trigger occurs, the navigation device 50 executes the reroute calculation as necessary (step S114).

Figure 10:
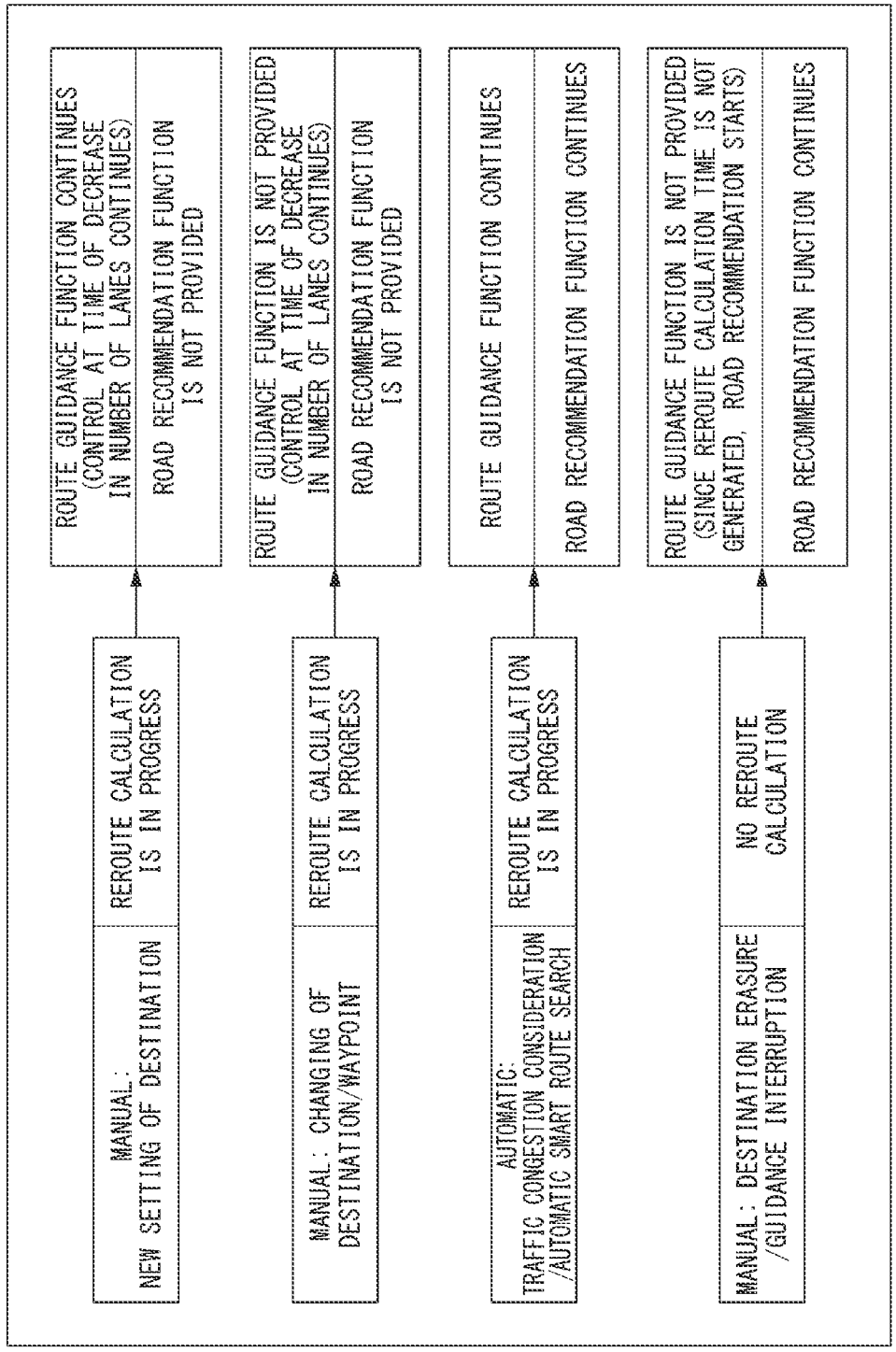
FIG. 10 is a diagram showing an example of information that is provided by the navigation device.

Here, the information transmitted by the navigation device 50, and control of the driving assistance device 100 according to the transmitted information in a case in which a trigger occurs will be described. FIG. 10 is a diagram showing an example of information provided by the navigation device 50. The navigation device 50 provides the driving assistance device 100 with, for example, information indicating a pattern of a trigger generated via the MPU 60 and information indicating whether the reroute calculation is in progress. The information indicating the pattern is, for example, information indicating whether the trigger has been generated manually or automatically, and information indicating a cause of trigger generation. The navigation device 50 provides the driving assistance device 100 with information for specifying the trigger pattern.

When the driving assistance device 100 receives information corresponding to pattern 1, the driving assistance device 100 stops the road recommendation. The information corresponding to pattern 1 is information indicating that a new destination has been manually set and that the reroute calculation is in progress.

When the driving assistance device 100 receives information corresponding to pattern 2, the driving assistance device 100 stops the branching recommendation and the road recommendation. The information corresponding to pattern 2 is information indicating that the target point has been manually changed and that the reroute calculation is in progress. For example, in a case in which an event in which the target point is changed to a second target point occurs when the recommendation at the time of branching to the first target point is being made, the navigation device 50 derives a target route to the second target point. When the event occurs, the driving assistance device 100 stops the recommendation at the time of branching to the first target point and performs the recommendation at the time of branching based on the target route when the target route is acquired from the navigation device 50.

When the driving assistance device 100 receives information corresponding to pattern 3, the driving assistance device 100 continues each recommendation. The information corresponding to pattern 3 is information indicating that traffic congestion consideration or smart route search has been automatically started and the reroute calculation is in progress. The navigation device 50 generates an event for automatically updating the first route to the first target point without depending on an operation of the user when the recommendation at the time of branching to the first target point is being made, to derive a second route depending on the event. When the event occurs, the driving assistance device 100 does not stop the recommendation at the time of branching based on the first route and stops the recommendation at the time of branching based on the first route when the second route is acquired from the navigation device 50 to execute recommendation of branching based on the second route.

When the driving assistance device 100 receives information corresponding to pattern 4, the driving assistance device 100 stops the recommendation of the branch. The information corresponding to pattern 4 is information indicating that the destination has been manually erased or the guidance has been suspended and that the reroute calculation has not been performed.

Return to the description of FIG. 9. For example, the navigation device 50 performs the reroute calculation in response to a trigger that requires the reroute calculation and transmits the calculated route to the MPU 60 when the navigation device 50 completes the reroute calculation (step S116). Next, the MPU 60 calculates a detailed route based on the transmitted route (step S118) and transmits the detailed route to the driving assistance device 100 (step S120). Next, the driving assistance device 100 executes control according to the route (step S122).

According to the embodiment described above, when an event regarding a route occurs in the navigation device 50, the driving assistance device 100 suppresses control for assisting steering on the basis of the event, making it possible to eliminate discrepancy between the guidance in the navigation device 50 and a behavior of the host vehicle M, and to prevent discomfort to the user. As a result, it is possible to improve convenience for the user.

The embodiment described above can be expressed as follows.

A control device includes
a storage device having a program stored therein, and
a hardware processor, and
wherein the hardware processor executes the program stored in the storage device to execute:
processing of recognizing a situation of surroundings of a host vehicle,
processing of automatically controlling at least steering of the host vehicle on the basis of the recognized situation of the surroundings to cause the host vehicle to perform lane change,
processing of acquiring information on a route from a navigation device guiding the route along which the host vehicle travels, and
processing of suppressing control for assisting the steering on the basis of an event regarding the route when the event occurs in the navigation device.

While forms for carrying out the present invention have been described using the embodiments, the present invention is not limited to these embodiments at all, and various modifications and substitutions can be made without departing from the gist of the present invention.

What is claimed is:

1. A vehicle system comprising:
a storage medium configured to store computer-readable instructions; and
one or more processors connected to the storage medium, wherein the one or more processors execute the computer-readable instructions to:
recognize a situation of surroundings of a host vehicle,
automatically control at least steering of the host vehicle on the basis of the recognized situation of the surroundings to cause the host vehicle to perform lane change,
acquire information on a route from a navigation device guiding the route along which the host vehicle travels, and
suppress control for assisting the steering on the basis of an event regarding the route when the event occurs in the navigation device.

2. The vehicle system according to claim 1, wherein the event includes one or more of an event for setting a destination of the host vehicle, an event for changing the destination, an event for setting a waypoint, an event for changing the waypoint, an event for erasing the destination, an event for erasing the waypoint, an event for searching for the route, an event for erasing the route, or an event for interrupting route-based guidance.

3. The vehicle system according to claim 1,
wherein the one or more processors execute the computer-readable instructions to:
change content of control at the time of suppression on the basis of a type of the event.

4. The vehicle system according to claim 1,
wherein the one or more processors execute the computer-readable instructions to:
suppress first control for assisting the steering according to a proposal of the vehicle system when the event occurs, and
permit second control for assisting the steering executed on the basis of an operation according to an intention of a driver of the host vehicle.

5. The vehicle system according to claim 1,
wherein the one or more processors execute the computer-readable instructions to:

be able to execute first control for causing the host vehicle to automatically perform lane change to a lane to a destination or waypoint (hereinafter referred to as a target point), and stop first control based on a route to a first target point in a case in which an event in which a user changes the target point from the first target point to a second target point occurs when the first control based on the route to the first target point is being executed.

6. The vehicle system according to claim 1, wherein the one or more processors execute the computer-readable instructions to:

be able to execute first control for causing the host vehicle to automatically perform lane change to a lane to a destination or waypoint (hereinafter referred to as a target point), and execute the first control after acquiring a route to a new destination from the navigation device when the event is a setting of the new destination.

7. The vehicle system according to claim 5, wherein the one or more processors execute the computer-readable instructions to:

be able to execute third control for proposing causing the host vehicle to perform lane change to an adjacent lane adjacent to a lane in which the host vehicle travels without considering the destination, and causing the host vehicle to automatically perform the lane change to the adjacent lane when the proposal is approved by a driver, and stopping the third control in a case in which an event in which the target point is changed or an event in which a new target point is set occurs when the third control is being executed.

8. The vehicle system according to claim 1, wherein the one or more processors execute the computer-readable instructions to:

be able to execute first control for causing the host vehicle to automatically perform lane change to a lane to a destination or waypoint (hereinafter referred to as a target point), and continue first control based on a route to a first target point in a case in which an event in which the navigation device searches for the route to the first target point without depending on an operation of a user occurs when the first control based on the route to the first target point is being executed.

9. The vehicle system according to claim 8, wherein the one or more processors execute the computer-readable instructions to:

be able to execute third control for proposing causing the host vehicle to perform lane change to an adjacent lane adjacent to a lane in which the host vehicle travels without considering the destination, and causing the host vehicle to automatically perform the lane change to the adjacent lane when the proposal is approved by a driver, and continue the third control in a case in which an event in which the navigation device searches for a route to the first target point without depending on an operation of the user occurs when the third control is being executed.

10. The vehicle system according to claim 1, wherein the one or more processors execute the computer-readable instructions to:

be able to execute first control for causing the host vehicle to automatically perform lane change to a lane to a destination or waypoint (hereinafter referred to as a target point), be able to execute third control for proposing causing the host vehicle to perform lane change to an adjacent lane adjacent to a lane in which the host vehicle travels without considering the destination, and causing the host vehicle to automatically perform the lane change to the adjacent lane when the proposal is approved by a driver, and suspend the first control and start the third control in a case in which an event in which a user performs an operation for erasing a first target point or suspending the guidance to the first target point occurs when first control based on a route to the first target point is being executed.

11. The vehicle system according to claim 1, wherein the one or more processors execute the computer-readable instructions to be able to execute first control for causing the host vehicle to automatically perform lane change to a lane to a destination or waypoint (hereinafter referred to as a target point), and the navigation device derives a target route for travel toward a second target point in a case in which an event in which the target point is changed to the second target point occurs when the first control for travel toward a first target point is being performed, and the one or more processors execute the computer-readable instructions to stop the first control for travel toward the first target point when the event occurs and execute first control based on the target route when the target route is acquired from the navigation device.

12. The vehicle system according to claim 1, wherein the one or more processors execute the computer-readable instructions to be able to execute first control for causing the host vehicle to automatically perform lane change to a lane to a destination or waypoint (hereinafter referred to as a target point), and the navigation device generates an event in which a first route to the first target point is automatically updated without depending on an operation of the user when first control for travel toward the first target point is being performed, and derives a second route depending on the event, and the one or more processors execute the computer-readable instructions not to stop first control based on first route when the event occurs, and to stop the first control based on the first route and execute first control based on the second route when the second route is acquired from the navigation device.

13. A control method, by a control device, executing:

processing of recognizing a situation of surroundings of a host vehicle, processing of automatically controlling at least steering of the host vehicle on the basis of the recognized situation of the surroundings to cause the host vehicle to perform lane change, processing of acquiring information on a route from a navigation device guiding the route along which the host vehicle travels, and processing of suppressing control for assisting the steering on the basis of an event regarding the route when the event occurs in the navigation device.

14. A non-transitory storage medium having a program stored therein, the program causing a control device when executed, perform the steps comprising:

recognizing a situation of surroundings of a host vehicle,
automatically controlling at least steering of the host vehicle on the basis of the recognized situation of the surroundings to cause the host vehicle to perform lane change,
acquiring information on a route from a navigation device guiding the route along which the host vehicle travels, and
suppressing control for assisting the steering on the basis of an event regarding the route when the event occurs in the navigation device.

* * * * *